United States Patent
Wildgrube et al.

(10) Patent No.: US 9,694,671 B2
(45) Date of Patent: Jul. 4, 2017

(54) FUEL SYSTEM FOR A VEHICLE

(71) Applicant: Oshkosh Corporation, Oshkosh, WI (US)

(72) Inventors: Grant D. Wildgrube, Fairbault, MN (US); Clint D. Glunz, Rochester, MN (US); Shashank Bhatia, Rochester, MN (US); Bryan S. Datema, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 69 days.

(21) Appl. No.: 14/098,143

(22) Filed: Dec. 5, 2013

(65) Prior Publication Data
US 2015/0159564 A1   Jun. 11, 2015

(51) Int. Cl.
B60K 15/01   (2006.01)
F02M 21/02   (2006.01)

(52) U.S. Cl.
CPC ....... B60K 15/013 (2013.01); F02M 21/0212 (2013.01); F02M 21/0221 (2013.01); F02M 21/0239 (2013.01); Y02T 10/32 (2013.01)

(58) Field of Classification Search
CPC ............ B60K 15/013; B60K 15/03006; B60K 15/03013; B60K 15/03026; B60K 2015/03118; B60K 2015/0319; B60K 2015/0321
USPC ................................................ 180/69.4, 69.5
See application file for complete search history.

(56) References Cited

U.S. PATENT DOCUMENTS

| | | | | |
|---|---|---|---|---|
| 3,583,375 A | * | 6/1971 | Pischinger | F02B 47/08 123/568.11 |
| 3,589,395 A | * | 6/1971 | Bottum | F17C 13/00 137/592 |
| 3,636,723 A | * | 1/1972 | Kramer | F25B 43/006 62/197 |
| 3,722,819 A | * | 3/1973 | Hall | B05B 1/083 239/322 |
| 3,749,495 A | * | 7/1973 | Wilkins | G01N 21/3518 250/341.6 |
| 3,826,096 A | * | 7/1974 | Hrusch | F02C 6/06 60/656 |
| 4,120,319 A | | 10/1978 | Krechel et al. | |
| 4,227,497 A | * | 10/1980 | Mathieson | 123/525 |
| 4,545,737 A | * | 10/1985 | Stanton | E21B 17/07 417/399 |

(Continued)

OTHER PUBLICATIONS

Parker-Hannifin Corporation, Industrial Hydraulic Technology, Bulletin 0221-B1, Apr. 1991, Parker Corp, pp. 6-6 and 6-7.*

*Primary Examiner* — Frank Vanaman
(74) *Attorney, Agent, or Firm* — Foley & Lardner LLP

(57) ABSTRACT

A natural gas system for a vehicle includes a fuel pod, a conduit defining a flow path, a fuel control module, and an accumulator. The fuel pod includes a fuel tank configured to store natural gas. The conduit includes a first end coupled to the fuel pod and a second end configured to be coupled to an engine. The fuel control module is disposed along the flow path and configured to regulate a flow of natural gas to the engine. The accumulator is disposed along the flow path downstream of the fuel control module. The accumulator is configured to buffer variations in the flow of natural gas such that the engine receives a consistent flow of natural gas.

9 Claims, 13 Drawing Sheets

(56) References Cited

U.S. PATENT DOCUMENTS

| | | | |
|---|---|---|---|
| 5,024,250 A * | 6/1991 | Nakamura | F15B 1/08 138/104 |
| 5,161,738 A | 11/1992 | Wass | |
| 5,188,017 A * | 2/1993 | Grant et al. | 91/459 |
| 5,305,790 A | 4/1994 | Giacomini | |
| 5,477,840 A * | 12/1995 | Neumann | 123/564 |
| 5,522,369 A * | 6/1996 | Povinger | 123/527 |
| 5,576,493 A * | 11/1996 | Sowinski | 73/708 |
| 5,586,579 A | 12/1996 | Diehl | |
| 5,832,906 A * | 11/1998 | Douville et al. | 123/527 |
| 6,036,352 A | 3/2000 | Sakamoto | |
| 6,112,760 A | 9/2000 | Scott et al. | |
| 6,321,775 B1 | 11/2001 | Hildebrand et al. | |
| 6,651,433 B1 * | 11/2003 | George, Jr. | 60/618 |
| 7,931,397 B2 | 4/2011 | Datema | |
| 8,534,403 B2 | 9/2013 | Pursifull | |
| 2007/0155285 A1 * | 7/2007 | Padgett et al. | 451/5 |
| 2008/0098562 A1 * | 5/2008 | Tagliaferri | 15/340.1 |
| 2008/0103676 A1 * | 5/2008 | Ancimer et al. | 701/103 |
| 2011/0023853 A1 * | 2/2011 | Lund | F02D 19/0647 123/590 |
| 2012/0145126 A1 * | 6/2012 | Krug | F02D 19/0628 123/447 |
| 2013/0021867 A1 | 1/2013 | Shimizu | |

* cited by examiner

FUEL SYSTEM FOR A VEHICLE

BACKGROUND

Refuse vehicles collect a wide variety of waste, trash, and other material from residences and businesses. Operators use the refuse vehicle to transport the material from various waste receptacles within a municipality to a storage or processing facility (e.g., a landfill, an incineration facility, a recycling facility, etc.). Refuse vehicles may be powered by an internal combustion engine that burns gasoline, diesel fuel, or natural gas, among other types of fuel. Where the fuel is natural gas, various tanks provide fuel to a regulator, which reduces the pressure of the natural gas before it enters the engine. Mechanical regulators provide an inconsistent flow of natural gas that varies based upon the pressure of the fuel in the natural gas tanks. The natural gas tanks may be positioned above the roof of the body assembly. To isolate the natural gas tanks, an operator boards the refuse vehicle and engages valves positioned at the head of each tank. Despite these deficiencies, assemblies that provide variations in the natural gas flow and include tanks that must be individually isolated remain the primary fuel systems for natural gas powered refuse vehicles.

SUMMARY

One embodiment of the invention relates to a natural gas system for a vehicle that includes a fuel pod, a conduit defining a flow path, a fuel control module, and an accumulator. The fuel pod includes a fuel tank configured to store natural gas. The conduit includes a first end coupled to the fuel pod and a second end configured to be coupled to an engine. The fuel control module is disposed along the flow path and configured to regulate a flow of natural gas to the engine. The accumulator is disposed along the flow path downstream of the fuel control module. The accumulator is configured to buffer variations in the flow of natural gas such that the engine receives a consistent flow of natural gas.

Another embodiment of the invention relates to a natural gas system for a vehicle that includes a tank configured to provide a supply flow of natural gas, a conduit defining a flow path, a valve disposed along the flow path, and a controller. The conduit includes a first end coupled to the tank and a second end configured to be coupled to an engine. The valve is configured to provide a regulated flow of natural gas to the engine by adjusting the supply flow of natural gas. The controller is configured to evaluate a target pressure for the regulated flow of natural gas and selectively engage the valve such that the engine receives natural gas at the target pressure.

Still another embodiment of the invention relates to a vehicle that includes a chassis, a body assembly, and a natural gas fuel system. The chassis includes an engine coupled to a frame. The body assembly is coupled to the frame and includes a plurality of sidewalls and an upper wall. The natural gas fuel system includes a fuel pod, a fuel regulator, and a shutoff valve. The fuel pod includes a plurality of natural gas fuel tanks positioned along the upper wall of the body assembly, and the fuel pod is coupled to the engine with a plurality of conduits that define a flow path. The fuel regulator is disposed along the flow path and configured to regulate a flow of natural gas to the engine. The shutoff valve is disposed along the flow path between the fuel pod and the fuel regulator, and the shutoff valve is coupled to a lower portion of the body assembly such that an operator standing alongside the vehicle may isolate the fuel pod by engaging the shutoff valve.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
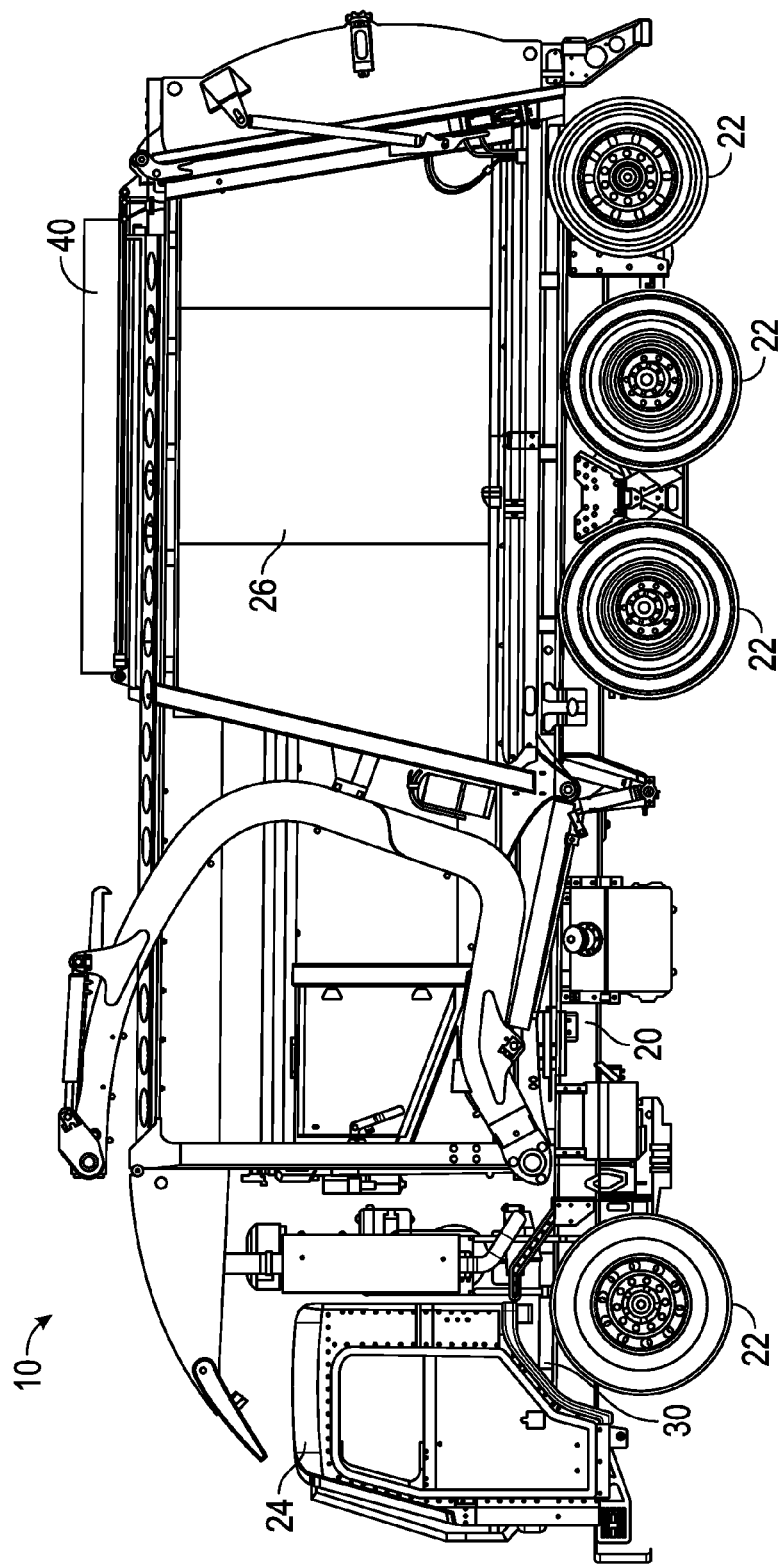
FIG. 1 is a side plan view of a refuse vehicle including a fuel pod, according to an exemplary embodiment.

Referring to the exemplary embodiment shown in FIG. 1, a vehicle, shown as refuse truck 10 (e.g., garbage truck, waste collection truck, sanitation truck, etc.), includes a chassis, shown as chassis 20. According to an alternative embodiment, the vehicle is another type of vehicle (e.g., a concrete mixer truck, a military truck, etc.). Chassis 20 includes a pair of longitudinal frame rails extending along the length of refuse truck 10, according to an exemplary embodiment. In one embodiment, the prime mover provides power to various systems of refuse truck 10. By way of example, the prime mover may provide power to one or more tractive elements, shown as wheels 22, to move refuse truck 10. By way of another example, the prime mover may provide power to a pneumatic system, a hydraulic system, or still another system. A power take off unit may facilitate such power distribution.

Referring again to the exemplary embodiment shown in FIG. 1, refuse truck 10 includes a cab, shown as cab 24, that is coupled to chassis 20. Cab 24 includes various components to facilitate operation of refuse truck 10 by an operator (e.g., a seat, a steering wheel, hydraulic controls, etc.). Cab 24 is positioned at a front end of refuse truck 10. In other embodiments, the cab is otherwise positioned.

According to the embodiment shown in FIG. 1, refuse truck 10 includes a body assembly coupled to chassis 20. The body assembly includes a storage body, shown as body 26, that extends along the length of chassis 20 and is positioned behind cab 24. In other embodiments, body 26 is otherwise positioned. Refuse is stored within body 26 during transport from various waste receptacles within a municipality to a storage or processing facility (e.g., a landfill, an incineration facility, a recycling facility, etc.). A packing assembly may be positioned within body 26 to compact the loose refuse, thereby increasing the storage capacity of body 26. In one embodiment, body 26 includes an upper door to reduce the likelihood of loose refuse blowing out of body 26 during transport. As shown in FIG. 1, the body assembly also includes an arm having lift forks that engage a container to load refuse into body 26.

Referring still to FIG. 1, chassis 20 includes a prime mover, shown as engine 30, a drive train, hydraulic components (e.g., a hydraulic pump, etc.), and still other components to facilitate the operation of refuse truck 10. According to an exemplary embodiment, engine 30 is an internal combustion engine configured to generate mechanical power by igniting natural gas. As shown in FIG. 1, refuse truck 10 includes a fuel pod, shown as fuel pod 40. In one embodiment, fuel pod 40 is configured to store compressed natural gas (CNG). In another embodiment, fuel pod 40 is configured to store liquefied natural gas (LNG). Fuel pod 40 includes a fuel tank that is configured to store fuel (e.g., natural gas) for use in engine 30. In one embodiment, the fuel tank contains CNG. In another embodiment, the fuel tank contains LNG. The fuel tank may be configured to store CNG or LNG under preferred conditions (e.g., pressure, temperature, etc.). In one embodiment, the fuel tank is configured to store CNG at a tank pressure (e.g., 3,600 PSI, etc.). According to an exemplary embodiment, the fuel tank is configured to store CNG, and a tank wrapping is positioned around the fuel tank. The tank wrapping allows an operator to determine whether the tank has been struck (e.g., by road debris, by a tree branch, etc.). An operator may further inspect a tank that has been struck (e.g., to check for damage). According to an exemplary embodiment, the tank wrapping includes a pair of clam shells manufactured from moldable polyurethane sheets. According to an alternative embodiment, the tank wrapping is a film covering at least a portion of the tank. In other embodiments, the prime mover includes one or more electric motors. The electric motors may consume electrical power from an on-board energy storage device (e.g., batteries, ultra-capacitors, etc.), from an on-board generator (e.g., an internal combustion engine, a fuel cell, etc.), from an external power source (e.g., overhead power lines, etc.), or still another source and provide power to the systems of the refuse truck 10. Fuel pod 40 may store fuel for use by the on-board generator.

Figure 2:
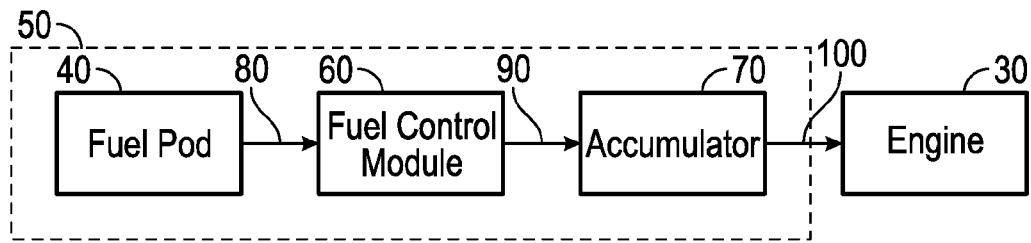
FIG. 2 is a schematic view of a natural gas system for a vehicle, according to an exemplary embodiment.

Referring next to the exemplary embodiment shown in FIG. 2, a natural gas system for a vehicle, shown as natural gas system 50, includes fuel pod 40, a fuel control module 60, and an accumulator 70. In one embodiment, the vehicle is a refuse truck. In another embodiment, the vehicle is another type of vehicle (e.g., a concrete mixer truck, a military truck, etc.). According to an exemplary embodiment, natural gas system 50 is configured to provide natural gas to engine 30. Engine 30 may combust the natural gas to power one or more tractive elements. In other embodiments, engine 30 combusts the natural gas to generate electricity or power a component of refuse truck 10. According to still other embodiments, natural gas system 50 is configured to provide natural gas for use by another component of refuse truck 10 (e.g., a fuel cell).

According to an exemplary embodiment, fuel control module 60 includes a pressure regulator configured to reduce the pressure of the natural gas from the tank pressure to a working pressure. In one embodiment, a heater (e.g., an electric heater) is coupled to the pressure regulator. The heater reduces the risk of freezing the valve due to the temperature decrease of the expanding natural gas. In one embodiment, the heater is controlled with a controller. The controller may operate according to a predetermined schedule (e.g., when the vehicle is running, a cycle of on for five minutes and off for five minutes, etc.) or may operate when a condition of the valve reaches a threshold value (e.g., when the valve temperature falls below 40 degrees Fahrenheit based on sensor signals from a temperature sensor, etc.). In still another embodiment, heat tape is wrapped around the pressure regulator, thereby reducing the risk of freezing the valve.

As shown in FIG. 2, fuel pod 40 is coupled to (e.g., in fluid communication with, etc.) fuel control module 60 with a conduit (i.e. pipe, hose, duct, line, tube, etc.), shown as high-pressure line 80. Fuel control module 60 is coupled to accumulator 70 and engine 30 with a second conduit, shown as low-pressure line 90, and a third conduit, shown as low-pressure line 100, according to an exemplary embodiment. The pressure regulator of fuel control module 60 reduces the pressure of the natural gas in high-pressure line 80 to provide natural gas along low-pressure line 90 and low-pressure line 100 at the working pressure. Fuel control module 60 may also include various other components (e.g., a fueling receptacle, pressure transducer coupled to a fuel gauge, high-pressure filter, etc.).

High-pressure line 80, low-pressure line 90, and low-pressure line 100 define a flow path between fuel pod 40 and engine 30. In one embodiment, fuel flows from fuel pod 40 to engine 30, and accumulator 70 is positioned along the flow path downstream of fuel control module 60. In other embodiments, fuel pod 40 is coupled to a first end of a conduit that defines a flow path, the conduit having a second end that is configured to be coupled to an engine. Fuel control module 60 may be disposed along the flow path, and accumulator 70 may be disposed along the flow path downstream of fuel control module 60.

Fuel control module 60 may provide natural gas to low-pressure line 90 at a flow rate and pressure that varies based on a characteristic of the natural gas from fuel pod 40 (e.g., the pressure of the natural gas from fuel pod 40, the flow rate of natural gas from fuel pod 40, etc.). As natural gas in fuel pod 40 is depleted during use, the tank pressure and flow rate decreases. Various other factors may also contribute to variations in the inlet flow of natural gas (e.g., the natural gas in high-pressure line 80). Such variations in the inlet flow of natural gas may cause fluctuations in the stream of natural gas provided by fuel control module 60. By way of example, the fluctuations may include a pressure variation, a temperature variation, a flow rate variation, or still another variation. The fluctuations may be produced due to the physical interaction of the natural gas with a mechanical regulator of fuel control module 60 of for still another reason.

According to an exemplary embodiment, accumulator 70 is configured to buffer variations in the flow of natural gas such that engine 30 receives a consistent flow of natural gas (e.g., a flow of natural gas that varies within ten percent of a target flow rate, a flow of natural gas that varies within ten percent of a target pressure, etc.). By way of example, accumulator 70 may be configured to buffer pressure variations in the flow of natural gas such that engine 30 receives a flow of natural gas having a consistent pressure. By way of another example, accumulator 70 may be configured to buffer flow rate variations such that engine 30 receives natural gas at a consistent flow rate. During operation, pressure variations, flow rate variations, or still other variations may cause the power produced by engine 30 to fluctuate. Power fluctuations may be undesirable where, by way of example, engine 30 powers tractive elements of a refuse truck. In one embodiment, accumulator 70 includes a drain and is positioned at a low height relative to the other components of natural gas system 50. Such a position and drain allows for oil and other contaminants to be drained from natural gas system 50.

Figure 3A:
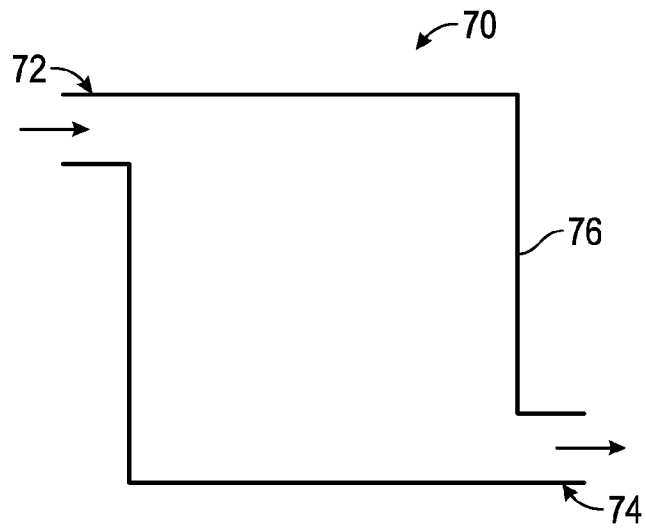
FIG. 3A is a side plan view of an accumulator for a natural gas system, according to one embodiment.
Figure 3B:
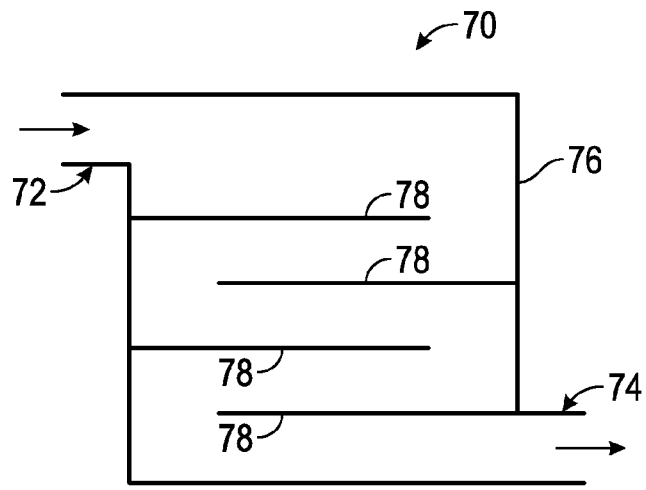
FIG. 3B is a side plan view of an accumulator for a natural gas system, according to an alternative embodiment.

Referring next to the exemplary embodiments shown in FIGS. 3A-3B, accumulator 70 is a reservoir that includes an inlet, shown as inlet 72, and an outlet, shown as outlet 74, defined within a housing 76. As shown in FIGS. 3A-3B, housing 76 has a rectangular cross-sectional shape. In other embodiments, housing 76 is otherwise shaped (e.g., cylindrical, spherical, etc.). Housing 76 defines an inner volume that may be fixed or variable. In one embodiment, inlet 72 is configured to be coupled to fuel control module 60 and outlet 74 is configured to be coupled to engine 30. In another embodiment, outlet 74 is configured to be coupled to still another component of natural gas system 50 (e.g., a high-pressure coalescing filter, etc.).

Natural gas flows along a flow path through accumulator 70, according to an exemplary embodiment. The flow path may be defined between inlet 72 and outlet 74 through the inner volume of housing 76. A flow of natural gas entering inlet 72 may include one or more fluctuations. By way of example, the pressure, temperature, or flow rate, among other characteristics, of the flow entering inlet 72 may vary as a function of time. According to an exemplary embodiment, the inner volume of housing 76 contains a volume of natural gas that buffers fluctuations in pressure, temperature, or flow rate of natural gas flow through inlet 72. By way of example, a pressure fluctuation acting on natural gas at inlet 72 is dissipated as it propagates through the natural gas within the inner volume of housing 76 such that the pressure fluctuation is reduced or eliminated at outlet 74. According to another exemplary embodiment, an interaction between the flow of natural gas and an inner surface of housing 76 dissipates pressure variations as the natural gas flows between inlet 72 and outlet 74.

According to an exemplary embodiment, accumulator 70 buffers fluctuations in flow of natural gas through inlet 72 without buffering set point changes to pressure, temperature, flow rate, or other characteristics. By way of example, brief variations in the flow of natural gas may include variations in pressure or flow rate caused by a mechanical regulator whereas set point changes to pressure or flow rate may be provided according to a control strategy for the natural gas system.

As shown in FIG. 3B, accumulator 70 includes a flow buffer, shown as baffle 78. In one embodiment, baffle 78 is configured to extend the length of the flow path through accumulator 70, thereby further reducing the prevalence of fluctuations in the flow of natural gas at outlet 74. In another embodiment, baffle 78 is configured to provide additional surface with which the flow of natural gas interacts, thereby further reducing the prevalence of fluctuations in flow of natural gas at outlet 74. According to the exemplary embodiment shown in FIG. 3B, accumulator 70 includes a plurality of baffles 78 arranged parallel to one another. In other embodiments, accumulator 70 includes a single baffle 78 or baffles 78 that are otherwise arranged. Baffles 78 are flat plates in the exemplary embodiment shown in FIG. 3B. In other embodiments, baffles 78 are otherwise shaped. By way of example, baffles 78 may be curved and arranged for form a coil that defines a spiraled flow path.

Figure 4:
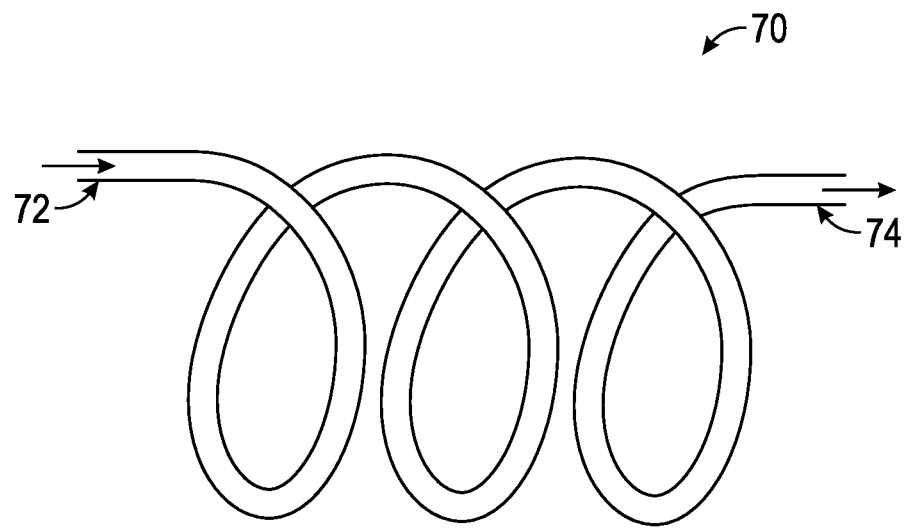
FIG. 4 is a side plan view of an accumulator for a natural gas system, according to an alternative embodiment.

Referring next to the exemplary embodiment shown in FIG. 4, accumulator 70 includes a supplemental length of conduit. As shown in FIG. 4, natural gas flows from inlet 72 to outlet 74 along a length of conduit. In one embodiment, a length of conduit beyond the length of conduit required to couple various components of a natural gas system defines the supplemental length. By way of example, a fuel control module may be separated from an engine by a conduit run distance of fifteen feet, and the fuel control module may be coupled to the engine with a conduit having a length of twenty feet, the difference between the conduit run distance and the conduit length defining the supplemental length of conduit that forms accumulator 70. As shown in FIG. 4, the supplemental length of conduit is coiled. According to an alternative embodiment, the supplemental length of conduit is otherwise arranged (e.g., looped, arranged in a U-shape, routed along a body or frame of a vehicle, etc.).

Figure 5:
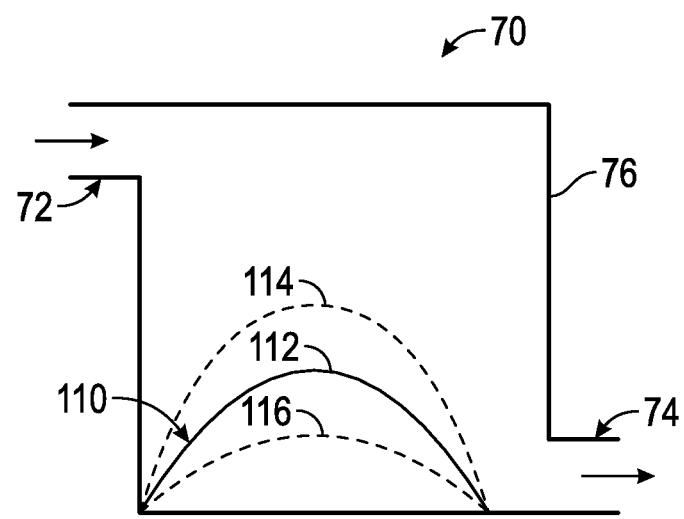
FIG. 5 is a side plan view of an accumulator for a natural gas system, according to an alternative embodiment.

Referring next to the exemplary embodiment shown in FIG. 5, accumulator 70 includes a movable wall 110 positioned within the inner volume of housing 76. Movable wall 110 is actuated to vary the inner volume of housing 76, according to an exemplary embodiment. Changing the inner volume of housing 76 varies a buffer level provided by accumulator 70 (e.g., the inner volume may be decreased to lower the buffer level, the inner volume may be increased to increase the buffer level, etc.). According to an exemplary embodiment, the buffer level may be lowered to reduce the impact of accumulator 70 on the flow of natural gas. In one embodiment, the buffer level of accumulator 70 is lowered to increase responsiveness and facilitate providing the engine with a variable flow of natural gas (e.g., a flow having a flow rate or pressure that varies based on a throttle input, etc.).

In one embodiment, the movable wall 110 is a rigid wall that may be actuated to change the inner volume of housing 76. According to the exemplary embodiment shown in FIG. 5, movable wall 110 is a flexible bladder that may be inflated from position 112 to position 114 or deflated from position 112 to position 116. Inflating the flexible bladder to position 114 may decrease the buffer level of accumulator 70 while deflating the flexible bladder to position 116 may increase the buffer level of accumulator 70. Such inflation or deflation of the flexible bladder may be facilitated by a fluid port (e.g., a hydraulic port, a pneumatic port, etc.) and various accumulators, pumps, valves, or other components. The fluid port may be coupled to an air system of a vehicle.

According to an exemplary embodiment, the inner volume of housing 76 is actively varied (e.g., by inflating and deflating the flexible bladder, by otherwise actuating movable wall 110, etc.) to counter pressure fluctuations in the flow of natural gas at inlet 72. By way of example, a pressure transducer may detect the pressure of the inlet flow of natural gas and provide sensor signals to a controller, and the controller may engage an actuator (e.g., a linear actuator, a rotational actuator, a source of a pressurized fluid, etc.) to generate a pressure wave that interfaces with and dampens the pressure fluctuation.

Figure 6:
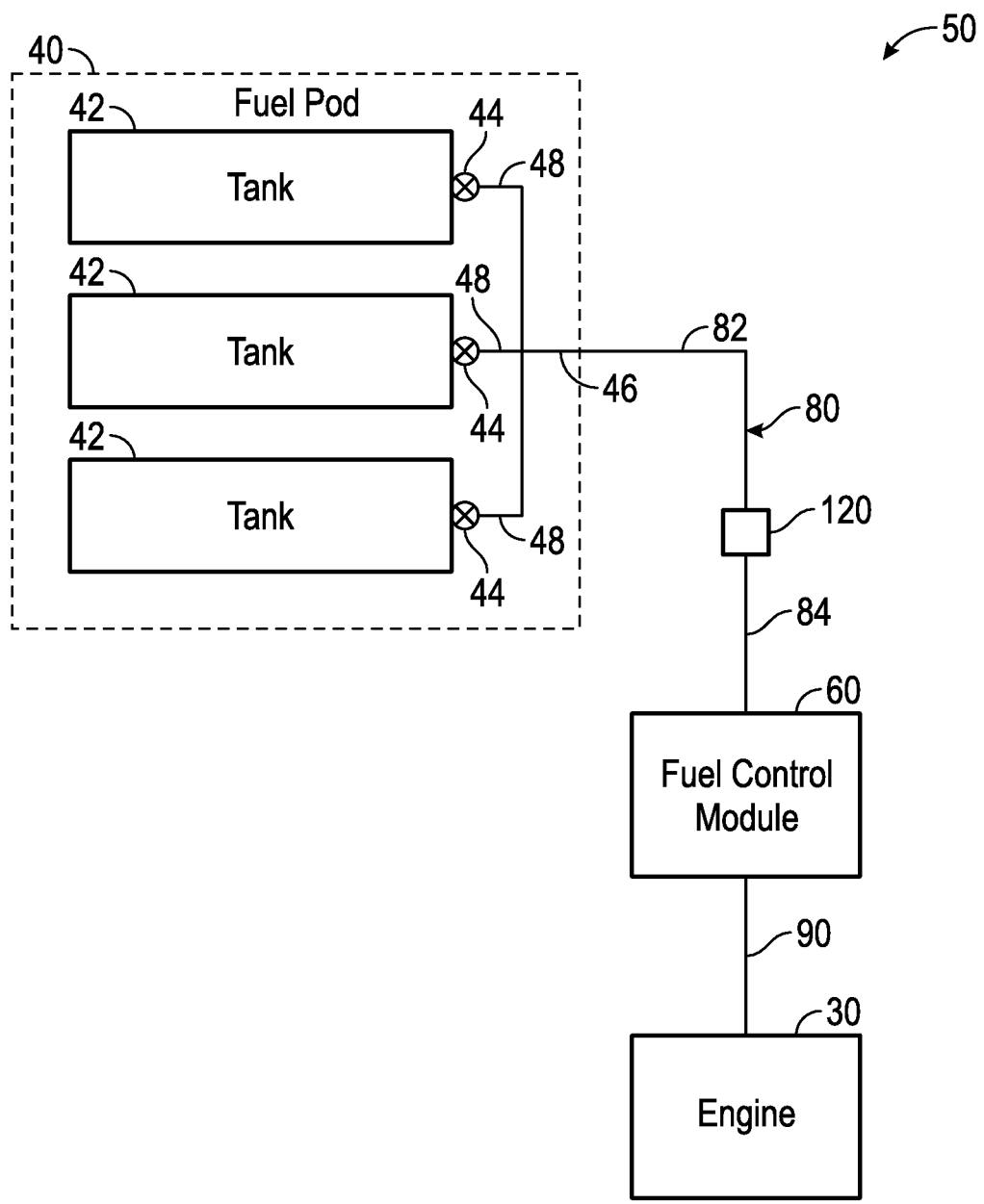
FIG. 6 is a schematic view of a natural gas system including a manifold and a fuel pod having a plurality of fuel tanks, according to one embodiment.
Figure 7:
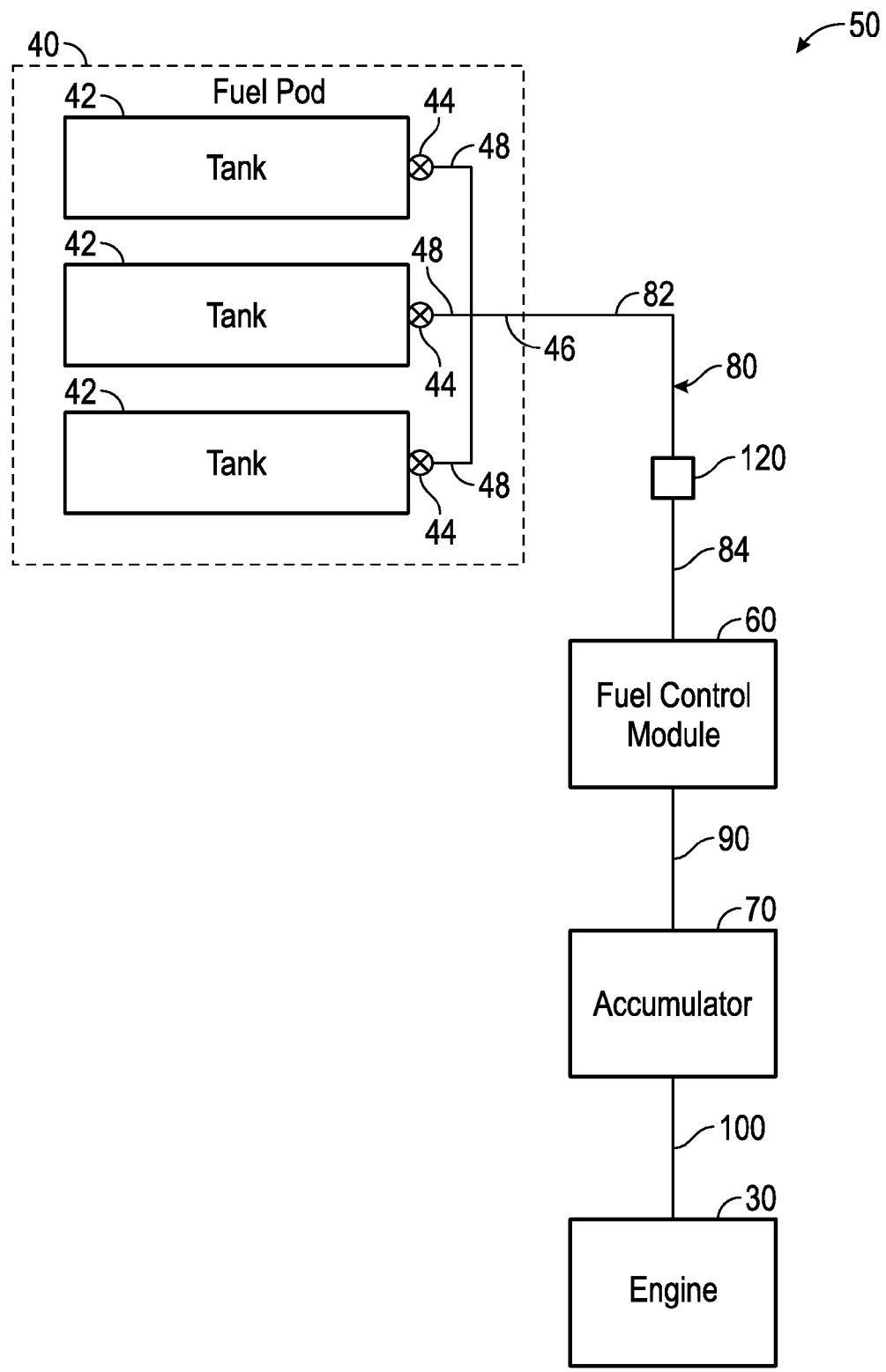
FIG. 7 is a schematic view of a natural gas system including a manifold and a fuel pod having a plurality of fuel tanks, according to an alternative embodiment.

Referring next to the exemplary embodiments shown in FIGS. 6-7, natural gas system 50 includes a manifold 120 disposed along the flow path defined along high-pressure line 80, which couples fuel pod 40 with fuel control module 60. As shown in FIGS. 6-7, a first conduit, shown as high-pressure line 82, couples fuel pod 40 with manifold 120, and a second conduit, shown as high-pressure line 84, couples manifold 120 with fuel control module 60. Manifold 120 includes various components configured to facilitate the operation of natural gas system 50. According to an alternative embodiment, manifold 120 is positioned downstream of fuel control module 60 (e.g., between fuel control module 60 and engine 30, between fuel control module 60 and accumulator 70, between accumulator 70 and engine 30, etc.).

Referring still to FIGS. 6-7, fuel pod 40 includes a plurality of tanks, shown as tanks 42. In other embodiments, fuel pod 40 includes more or fewer tanks 42. Tanks 42 are configured to store natural gas for use in engine 30, according to an exemplary embodiment. As shown in FIGS. 6-7, each tank 42 includes a shutoff valve 44. Shutoff valve 44 allows an operator, user, or other personnel to stop the flow of natural gas from tank 42, according to an exemplary embodiment. As shown in FIGS. 6-7, the flow of natural gas from each tank 42 is combined into a single outlet conduit 46 with a plurality of intermediate conduits 48. According to an exemplary embodiment, the single outlet conduit 64 interfaces with the various other components of natural gas system 50 to provide a flow of natural gas to engine 30. In one embodiment, single outlet conduit 46 is a separate line that is coupled to high-pressure line 80. In another embodiment, single outlet conduit 46 is defined by a portion of high-pressure line 80 (i.e. high-pressure line 82 may couple manifold 120 with a union of the plurality of intermediate conduits 48).

Figure 8:
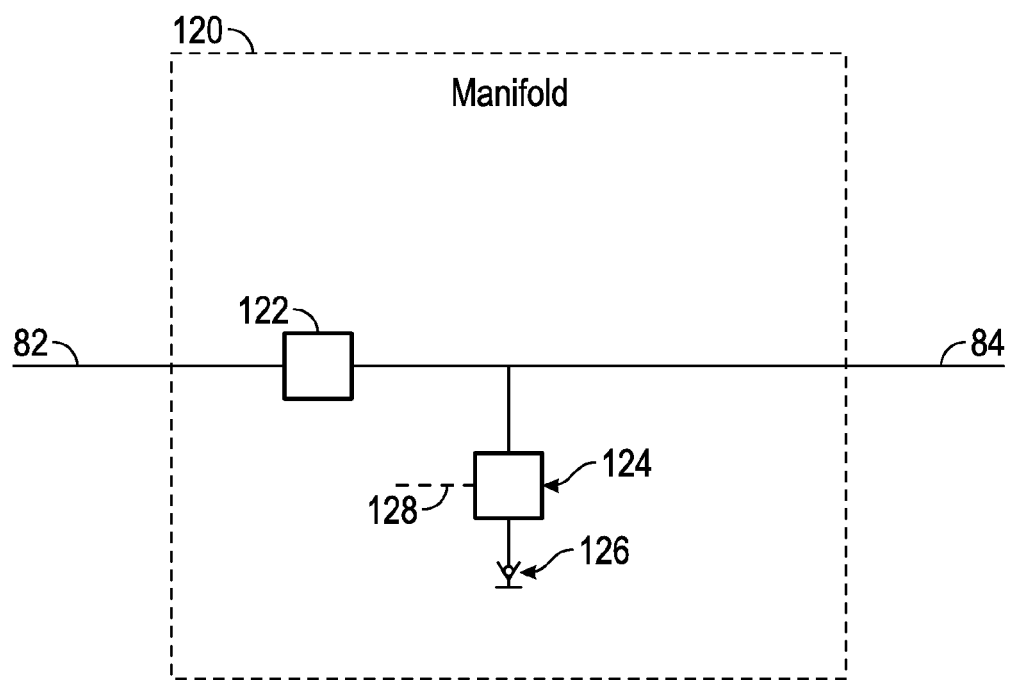
FIG. 8 is a schematic view of a manifold for a natural gas system including a shutoff valve, according to an exemplary embodiment.

As shown in FIG. 8, manifold 120 includes a shutoff valve 122 disposed along the flow path between fuel pod 40 and fuel control module 60. Closing shutoff valve 122 stops the flow of natural gas from fuel pod 40. In one embodiment, shutoff valve 122 includes a ball valve. In other embodiments, shutoff valve 122 includes another type of valve (e.g., a gate valve, etc.). Shutoff valve 122 is manually operated, according to an exemplary embodiment. According to an alternative embodiment, shutoff valve 122 is actuated electronically (e.g., with a solenoid). Such electronic actuation may occur upon user input or as part of a shutoff valve control strategy.

In one embodiment, natural gas system 50 defines at least a portion of the fuel system for a vehicle. Fuel pod 40 may positioned along the roof of a body assembly, according to an exemplary embodiment. In other embodiments, fuel pod 40 is positioned behind the drum on a concrete mixer truck. In still other embodiments, fuel pod 40 is still otherwise positioned. According to an exemplary embodiment, an operator may isolate each of the plurality of tanks 42 by closing shutoff valve 122. The position of shutoff valve 122 facilitates simultaneously stopping the flow of natural gas from each tank 42 of fuel pod 40. According to an exemplary embodiment, manifold 120 is positioned near fuel pod 40, thereby isolating a greater portion of the high-pressure natural gas system.

In the event of a fire onboard the vehicle, an operator may need to isolate each tank 42. Conventionally, where several natural gas tanks are positioned along the roof of a vehicle, an operator must climb to the roof of the vehicle and close valves to individually stop the flow of fuel from the tanks. Shutoff valve 122 facilitates the simultaneous disengagement of tanks 42, thereby reducing the need for an operator to shut off each tank 42 individually. In one embodiment, manifold 120 is positioned such that an operator standing alongside the vehicle may actuate shutoff valve 122, thereby reducing the need for the operator to board the vehicle to stop the flow of natural gas from tanks 42.

According to the exemplary embodiment shown in FIG. 8, manifold 120 includes a defueling valve 124 disposed along the flow path between fuel pod 40 and fuel control module 60. Defueling valve 124 facilitates removing fuel from fuel pod 40, according to an exemplary embodiment. According to an alternative embodiment, defueling valve 124 allows an operator to perform a pressure equalization and transfer natural gas to another vehicle. Defueling valve 124 is positioned along the outer surface of a body assembly for a vehicle, according to an exemplary embodiment. As shown in FIG. 8, defueling valve 124 engages a fitting 126 (e.g., a quick-release fitting) and a vent 128 to facilitate defueling and pressure equalization. In one embodiment, defueling valve 124 is a three-way ball valve having a first port exposed to high-pressure line 82, a second port in fluid communication with vent 128, and a third port exposed to fitting 126. The three-way ball valve facilitates venting natural gas pressure (e.g., through vent 128) within a hose used to defuel or perform a pressure equalization, according to an exemplary embodiment.

Figure 9:
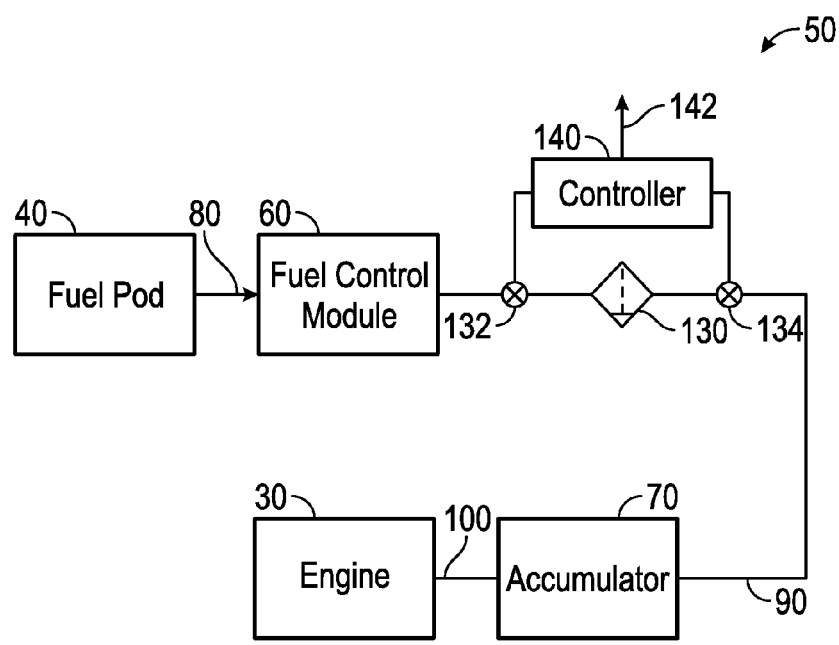
FIG. 9 is a schematic view of a natural gas system including a pair of pressure transducers and a filter, according to one embodiment.
Figure 10:
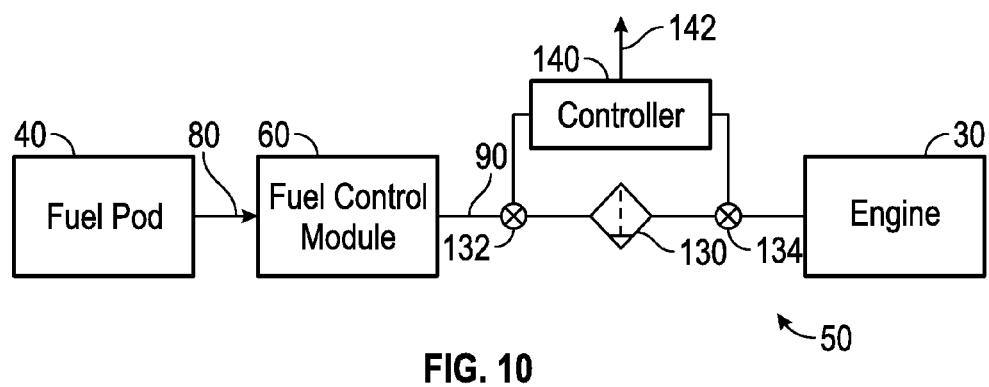
FIG. 10 is a schematic view of a natural gas system including a pair of pressure transducers and a filter, according to an alternative embodiment.

Referring next to the exemplary embodiments shown in FIGS. 9-10, natural gas system 50 includes a filter, shown as high-pressure coalescing filter 130, positioned downstream of fuel control module 60. As shown in FIG. 9, high-pressure coalescing filter 130 is positioned between fuel control module 60 and accumulator 70. As shown in FIG. 10, high-pressure coalescing filter 130 is positioned between fuel control module 60 and engine 30. In other embodiments, high-pressure coalescing filter 130 is otherwise positioned (e.g., upstream of fuel control module 60).

According to an exemplary embodiment, high-pressure coalescing filter 130 removes contaminants (e.g., oil, debris, etc.) from the flow of natural gas before it reaches engine 30. As shown in FIGS. 9-10, natural gas system 50 includes a first pressure transducer, shown as pressure transducer 132, positioned upstream of high-pressure coalescing filter 130 and a second pressure transducer, shown as pressure transducer 134, positioned downstream of high-pressure coalescing filter 130. Pressure transducer 132 and pressure transducer 134 measure the upstream and downstream pressure of the natural gas flowing through high-pressure coalescing filter 130, respectively.

As shown in FIGS. 9-10, natural gas fuel system 50 includes a controller 140. According to an exemplary embodiment, controller 140 is coupled to pressure transducer 132 and pressure transducer 134. In one embodiment, pressure transducer 132 and pressure transducer 134 are configured to provide sensor signals to controller 140 indicating the upstream and downstream pressure of the natural gas flowing through high-pressure coalescing filter 130, respectively. In one embodiment, controller 140 is configured to evaluate the sensors signals from pressure transducer 132 and pressure transducer 134 to determine a pressure differential across high-pressure coalescing filter 130. As high-pressure coalescing filter 130 removes contaminants from the flow of natural gas, high-pressure coalescing filter 130 begins to clog, and the pressure differential increases. According to an exemplary embodiment, controller 140 is configured to provide a signal 142 when the pressure differential exceeds a threshold value (e.g., 50 PSI, 90 PSI) (i.e. controller 140 provides a service signal). According to an alternative embodiment, signal 142 encodes data relating to an observed pressure differential (e.g., 20 PSI) across high-pressure coalescing filter 130.

In one embodiment, signal 142 is provided to a user interface (e.g., a display, a warning light, etc.) to alert an operator that high-pressure coalescing filter requires service or repair. In other embodiments, signal 142 is provided to still another system or device (e.g., a remote system that monitors the performance of the vehicle, a control system configured to limit the performance of the vehicle by entering a "limp mode" to prevent damage once the pressure differential exceeds the threshold value, etc.). Sending a service signal, a signal that encodes data, or providing a signal to another system reduces the likelihood that damage will occur to various components of the vehicle (e.g., engine 30, fouling of sensors or plugs, etc.) due to operating natural gas system 50 with an ineffective or clogged high-pressure coalescing filter 130.

Figure 11:
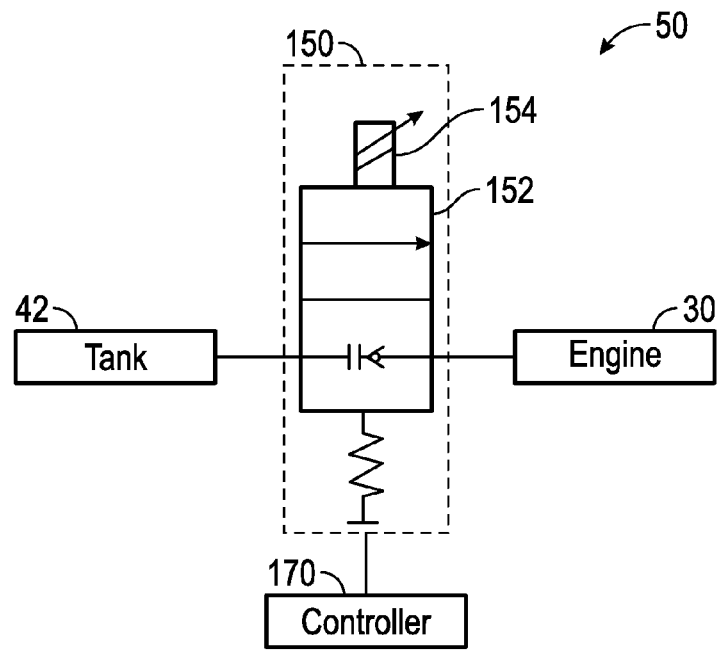
FIG. 11 is a schematic view of a natural gas system including a valve that regulates the flow of natural gas, according to one embodiment.
Figure 12:
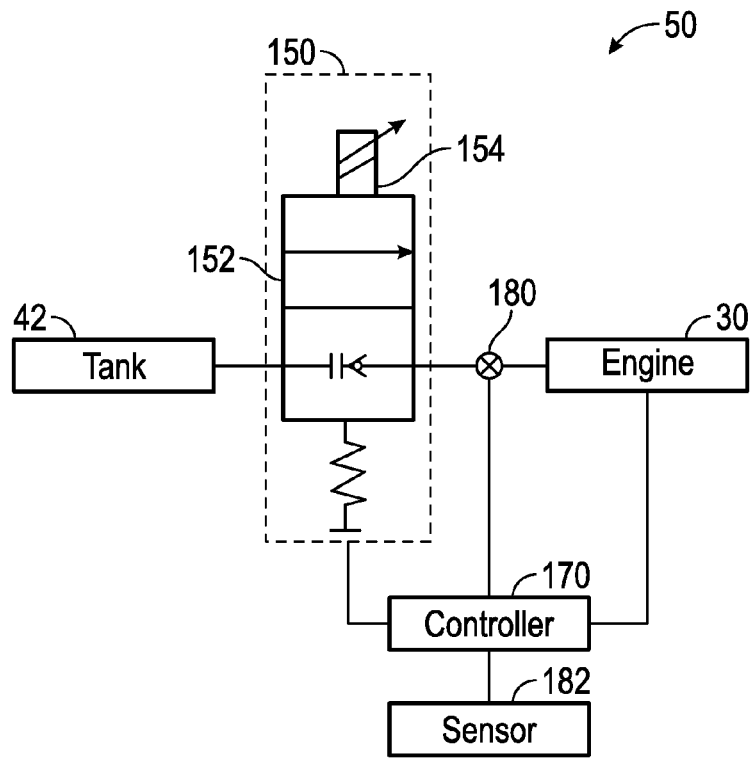
FIG. 12 is a schematic view of a natural gas system including a valve that regulates the flow of natural gas, according to an alternative embodiment.

Referring next to the exemplary embodiments shown in FIGS. 11-12, natural gas system 50 includes a valve 150 disposed along a flow path defined by a conduit coupling tank 42 and engine 30. Valve 150 replaces a traditional mechanical regulator, according to an exemplary embodiment. In one embodiment, valve 150 is actively adjustable and reduces the flow rate fluctuations common with fixed, mechanical regulators. Such flow rate fluctuations occur as a function of the pressure within tank 42 and may generate power fluctuations in engine 30. Tank 42 provides a supply flow of natural gas. According to an exemplary embodiment, valve 150 is configured to provide a regulated flow of natural gas to engine 30 by adjusting the supply flow of natural gas. As shown in FIGS. 11-12, a controller 160 is coupled to valve 150. According to an exemplary embodiment, controller 160 is configured to evaluate a target pressure (e.g., 110 PSI) for the regulated flow of natural gas and selectively engage valve 150 such that engine 30 receives natural gas at the target pressure. Selectively engaging valve 150 accounts for pressure variations due to decreased pressure in tank 42, losses due to interaction between the natural gas and the conduits and components of natural gas system 50, or still other conditions.

As shown in FIGS. 11-12, valve 150 includes a movable valve element 152 (e.g., a valve spool, a poppet, etc.) that is engaged by an actuator, shown as solenoid 154 (e.g., a proportional solenoid). Movable valve element 152 is movable between a closed position, shown in FIGS. 11-12, and various open positions where natural gas flows through valve 150. The flow rate, pressure, or other characteristic of the regulated flow of natural gas may vary based on the position of moveable valve element 152. As shown in FIGS. 11-12, movable valve element 152 is biased (e.g., with a resilient member) into a check valve configuration, where fluid flow through valve 150 is stopped.

According to an exemplary embodiment, valve 150 is coupled to a controller, shown as controller 170. In one embodiment, controller 170 is coupled to solenoid 154. Controller 170 may send and receive signals (e.g., electrical pulses) to or from solenoid 154. According to the embodiment shown in FIGS. 11-12, controller 170 is configured to send a command signal to solenoid 154. Solenoid 154 may actuate moveable valve element 152 as a function of the command signal. According to an exemplary embodiment controller 170 sends command signals to solenoid 154 such that engine 30 receives natural gas at the target pressure.

In one embodiment, controller 170 receives or retrieves the target pressure for the regulated flow of natural gas. By way of example, an operator may provide a target pressure using a user interface. By way of another example, a remote operation system may provide the target pressure to controller 170. By way of still another example, the target pressure may be stored in a memory (i.e. the target pressure may be retrieved by controller 170). Controller 170 may evaluate the target pressure and selectively engage valve 150.

As shown in FIG. 12, natural gas system 50 includes a sensor, shown as pressure transducer 180. Pressure transducer 180 is disposed along the flow path downstream of valve 150. According to an exemplary embodiment, pressure transducer 180 is configured to provide sensor signals relating to the pressure of the regulated flow of natural gas. According to an exemplary embodiment, pressure transducer 180 is positioned along the flow path near engine 30 such that pressure transducer 180 reads the pressure of the natural gas as it flows into engine 30. By way of example, the pressure of the regulated flow of natural gas may be at the target pressure near the output of valve 150 but decrease due to line losses as it travels to engine 30. Positioning pressure transducer 180 along the flow path near engine 30 reduces the error that may otherwise be associated with such line loses and reduces the risk of providing engine 30 with a flow of natural gas below the target pressure.

In one embodiment, controller 170 is configured to evaluate the sensor signals as part of a closed-loop control strategy. By way of example, controller 170 may be configured to evaluate the sensor signals from pressure transducer 180 and compare the pressure of the regulated flow of natural gas to the target pressure. Controller 170 may be configured to engage solenoid 154 while the pressure observed by pressure transducer 180 differs from the target pressure. Such a closed-loop control strategy may employ a deadband pressure variation (e.g., 5 PSI). Controller 170 is configured to not engage solenoid 154 when the pressure observed by pressure transducer 180 falls within the deadband pressure variation, according to one embodiment. Employing a deadband pressure variation reduces actuation of solenoid 154 and limits premature wear on the components of natural gas system 50, according to one embodiment. In other embodiments, controller 170 is configured to employ an open-loop control strategy and engage valve 150 without regard for the pressure of the regulated flow of natural gas.

As shown in FIG. 12, natural gas system 50 includes a sensor 182 that is coupled to controller 170 and configured to provide sensor signals. In one embodiment, sensor 182 is a throttle position sensor configured to provide information relating to a requested throttle input for a vehicle (e.g., a refuse truck, a concrete mixer truck, a military truck, etc.). According to the embodiment shown in FIG. 12, controller 170 is coupled to engine 30. By way of example, controller 170 may be coupled to a controller area network bus of engine 30 (e.g., part of an engine management system). Various signals relating to an engine condition of engine 30 may be provided to controller 170. In one embodiment, the engine condition includes at least one of a current fuel consumption demand, whether the engine is running lean or rich, and a signal from a post-combustion oxygen sensor.

According to one embodiment, controller 170 is configured to determine the target pressure using information from at least one of engine 30 and sensor 182. In one embodiment, controller 170 is configured to determine the target pressure based on the requested throttle input. By way of example, the target pressure may increase such that engine 30 receives more fuel when an operator depresses a throttle pedal. In another embodiment, controller 170 is configured to determine the target pressure based on an engine condition (e.g., a current fuel consumption demand, etc.). In still another embodiment, controller 170 determines the target pressure using an offset provided by an operator. By way of example, an operator may manually control the target pressure or may engage a "high idle" mode and increase the target pressure above that required based the current engine conditions.

Figure 13:
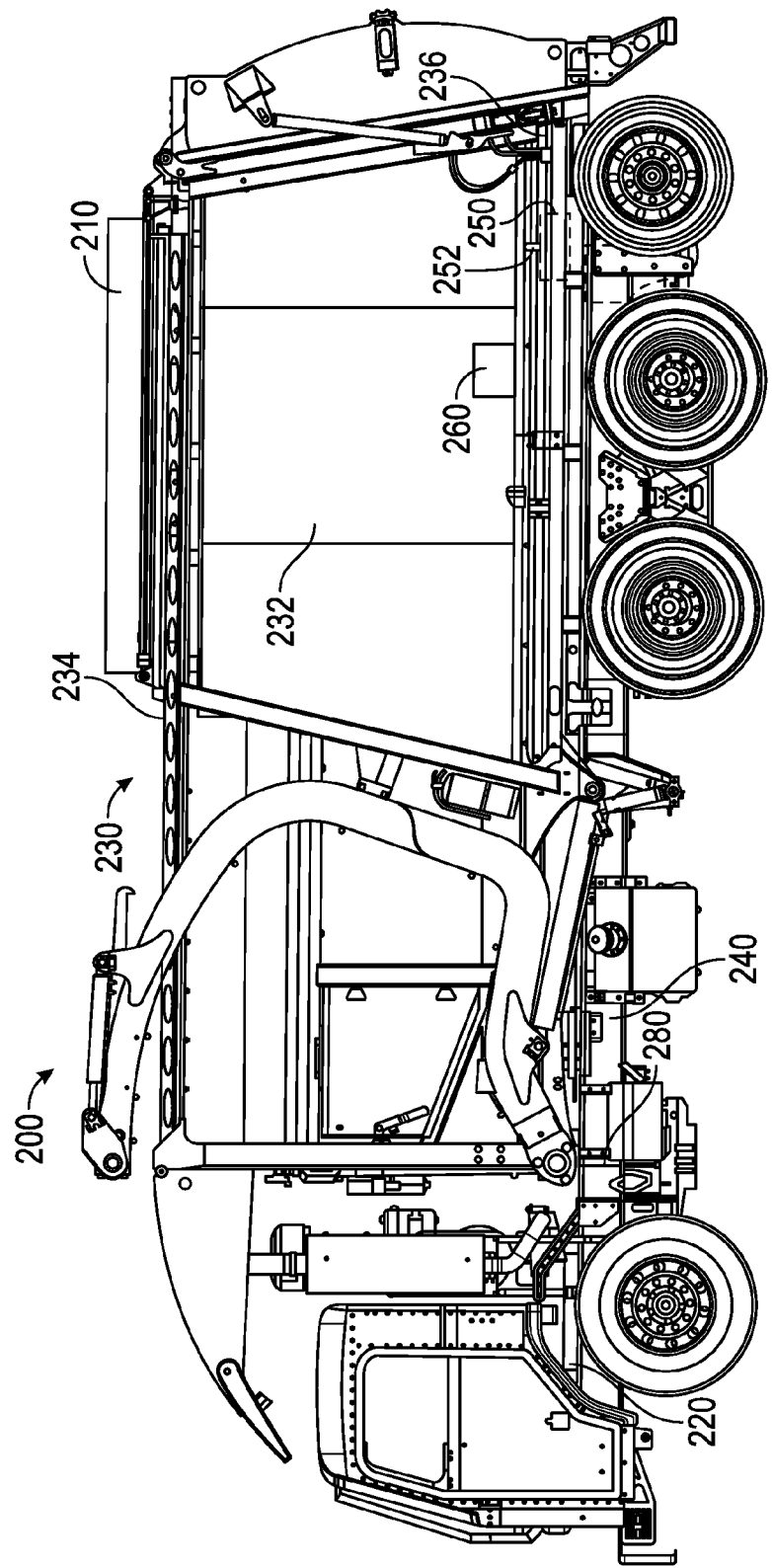
FIG. 13 is a side plan view of a refuse vehicle including a fuel pod, a valve, a user access panel, and a pressure regulator, according to an exemplary embodiment.

Referring next to the exemplary embodiments shown in FIGS. 13-17, a vehicle, shown as refuse truck 200, includes a fuel pod 210 configured to provide natural gas to power an engine 220. According to an alternative embodiment, the vehicle is another type of vehicle (e.g., a concrete mixer truck, a military truck, etc.). As shown in FIG. 13, refuse truck 200 includes a body assembly, shown as body assembly 230, coupled to a frame 240. According to an exemplary embodiment, body assembly 230 includes a plurality of sidewalls 232, an upper wall 234, and a fender panel, shown as fender 236. As shown in FIG. 13, fender 236 is positioned along a lower portion of sidewall 232.

Fuel pod 210 includes a plurality of natural gas fuel tanks, according to an exemplary embodiment, positioned along upper wall 234 of body assembly 230. Fuel pod 210 is coupled to engine 220 with a plurality of conduits that define a flow path. According to an exemplary embodiment, a fuel regulator 270 is disposed along the flow path and configured to regulate a flow of natural gas from fuel pod 210.

Figure 14:
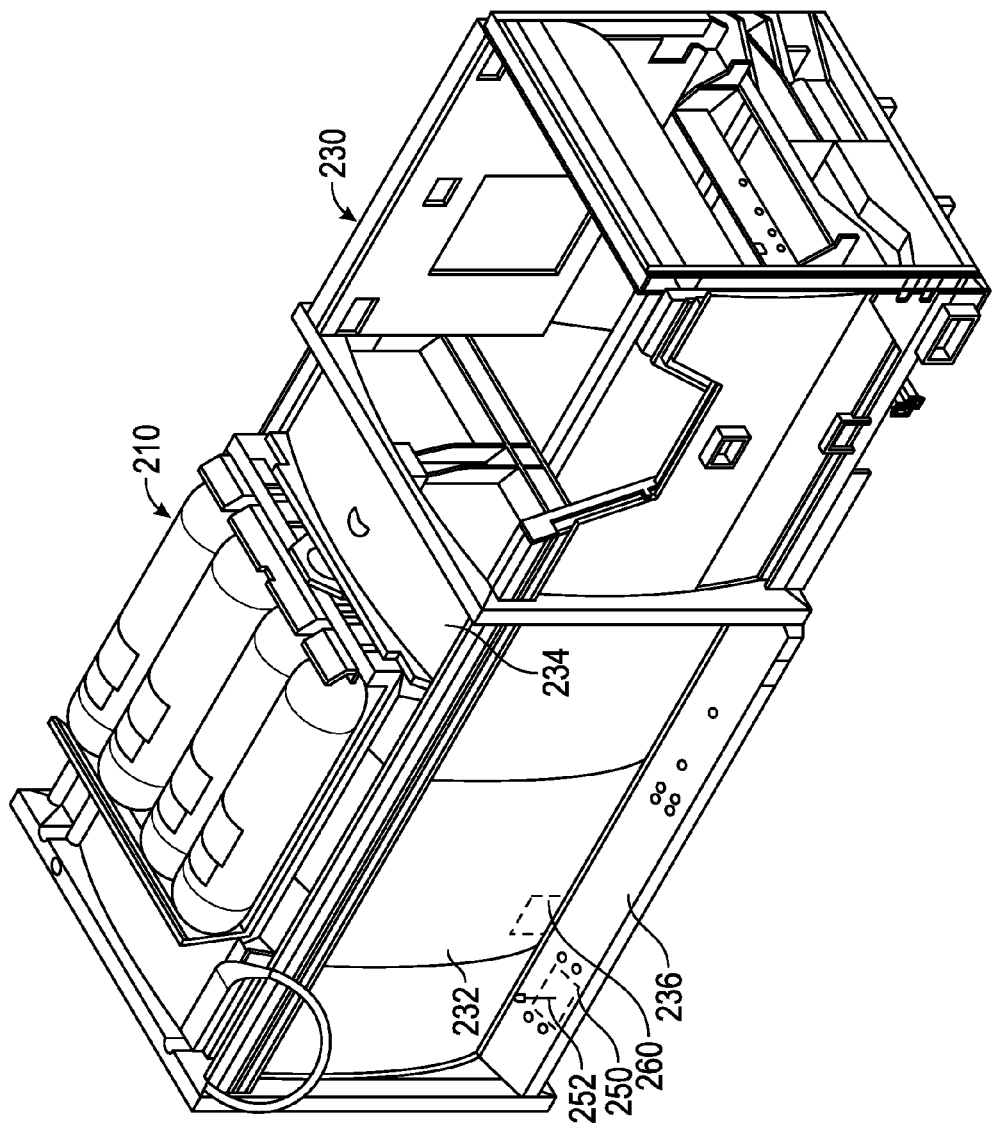
FIG. 14 is a perspective view of a body assembly for a refuse vehicle including a fuel pod, a valve, and a user access panel, according to an exemplary embodiment.
Figure 15:
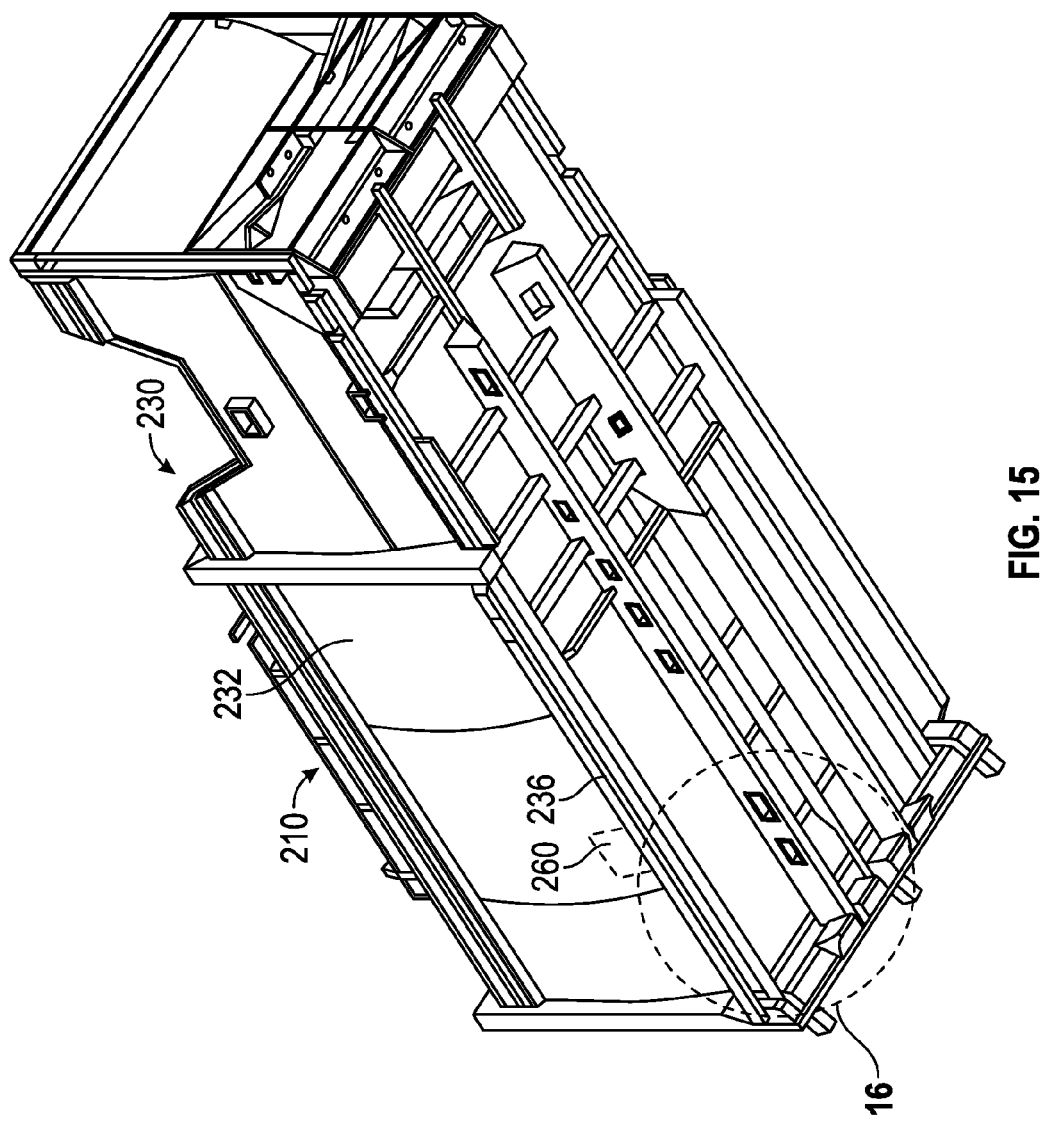
FIG. 15 is another perspective view of a body assembly for a refuse vehicle including a fuel pod, a valve, and a user access panel, according to an exemplary embodiment.
Figure 16:
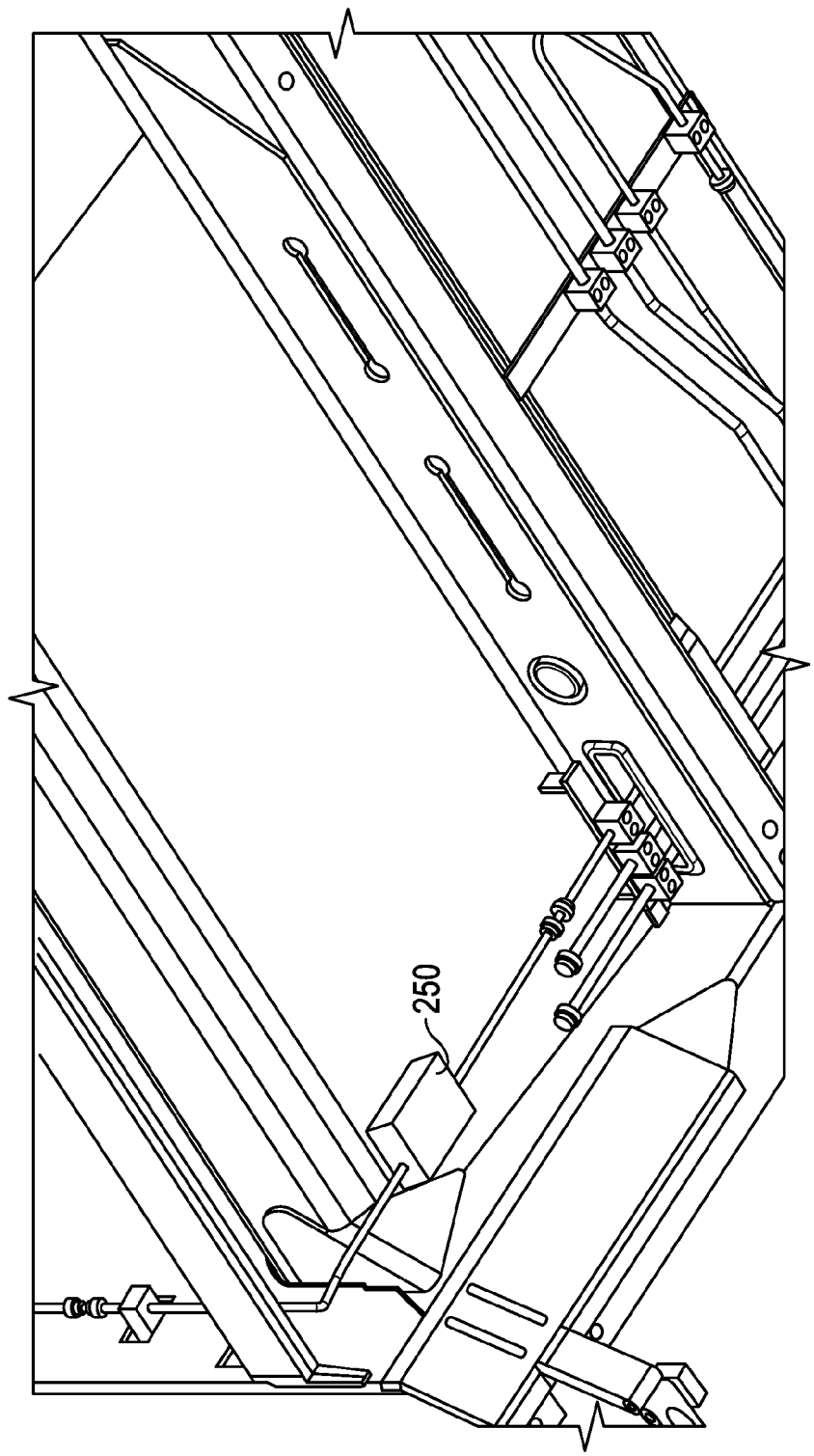
FIG. 16 is another perspective view of a body assembly for a refuse vehicle including a fuel pod, a valve, and a user access panel, according to an exemplary embodiment.

As shown in FIG. 13, refuse truck 200 includes a shutoff valve 250 disposed along the flow path between fuel pod 210 and fuel regulator 270. Shutoff valve 250 includes a lever, shown as lever 252, that is configured to actuate shutoff valve 250 and control the flow of natural gas from fuel pod 210. According to an exemplary embodiment, shutoff valve 250 is coupled to a lower portion of body assembly 230 such that an operator standing alongside refuse truck 200 may isolate the fuel pod by engaging shutoff valve 250. As shown in FIGS. 13-14, shutoff valve 250 is positioned underneath fender 236.

Referring still to the exemplary embodiment shown in FIG. 13, refuse truck 10 includes a user access panel 260. As shown in FIG. 13, user access panel 260 is positioned along a lower portion of body assembly 230 such that an operator standing alongside refuse truck 200 may engage one or more components of user access panel 260. In one embodiment, user access panel 260 provides a user interface, while various components of the natural gas system (e.g., fuel regulator 270) are positioned laterally inboard (e.g., between frame rails of frame 240). Positioning various components of the natural gas system (e.g., fuel regulator 270) laterally inboard of user access panel 260 facilitates mounting still other components along the outer surface of body assembly 230 without limiting an operator's ability to control the natural gas system. Refuse truck 200 spaces large components and associated fittings of fuel regulator 270 from exposed areas of body assembly 230, thereby allowing use of the exposed area for other purposes (e.g., to provide storage). According to an alternative embodiment, user access panel 260 is positioned within a fuel storage unit.

Figure 17:
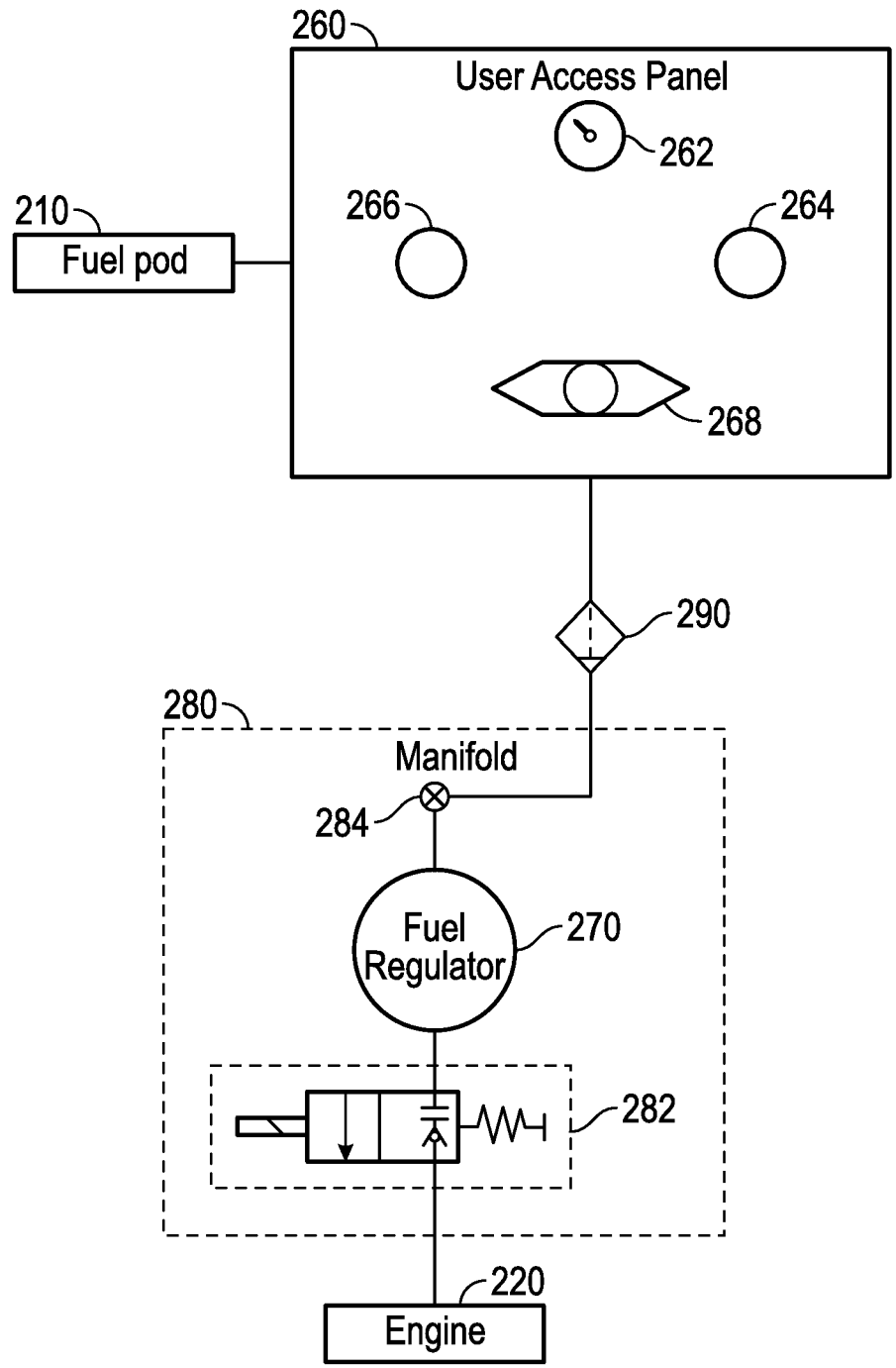
FIG. 17 is a schematic view of a natural gas system including a user access panel that is separated from a fuel regulator, according to an exemplary embodiment.

Referring next to FIG. 17, user access panel 260 is disposed along a flow path between fuel pod 210 and fuel regulator 270. Fuel regulator 270 is included as part of a manifold 280. In one embodiment, manifold 280 is positioned near engine 220, thereby reducing the impact of post-regulation pressure losses and increasing the likelihood of providing natural gas to engine 220 at a target or preset pressure.

According an exemplary embodiment, manifold 280 includes a shutoff valve 282 and a pressure transducer 284. As shown in FIG. 17, shutoff valve 282 includes a normally closed solenoid valve, which allows disengagement of the natural gas system from engine 220. Shutoff valve 282 is engaged and disengaged with a controller, according to an exemplary embodiment. Pressure transducer 284 is positioned upstream of fuel regulator 270 and provides sensor signals (e.g., digital signals to a controller or gauge, analog signals to a controller or gauge, etc.) relating to the pressure of the natural gas in fuel pod 210. Pressure transducer 284 provides a signal (e.g., a signal of between 0.5 volts and 4.5 volts) relating to the pressure of the natural gas in fuel pod 210 to a gauge positioned in a cab of refuse truck 200, according to an exemplary embodiment. According to the exemplary embodiment shown in FIG. 17, a filter 290 is positioned along the flow path between fuel pod 210 and engine 220.

Referring still to FIG. 17, user access panel 260 includes a high-pressure fuel gauge 262, a first fuel receptacle 264 (e.g., a NGV1 fuel receptacle), a second fuel receptacle 266 (e.g., a transit fill fuel receptacle), and a manual shutoff valve 268. As shown in FIG. 17, high-pressure fuel gauge 262 is an analog gauge configured to indicate a fill level (e.g., a pressure) of the natural gas within fuel pod 210. In other embodiments, high-pressure fuel gauge 262 receives a signal from a pressure transducer (e.g., pressure transducer 284) and indicates a fill level of the natural gas within fuel pod 210.

At least one of the various controllers described herein may be implemented as a general-purpose processor, an application specific integrated circuit (ASIC), one or more field programmable gate arrays (FPGAs), a digital-signal-processor (DSP), a group of processing components, or other suitable electronic processing components. In one embodiment, at least one of the controllers includes memory and a processor. The memory is one or more devices (e.g., RAM, ROM, Flash Memory, hard disk storage, etc.) for storing data and/or computer code for facilitating the various processes described herein. The memory may be or include non-transient volatile memory or non-volatile memory. The memory may include database components, object code components, script components, or any type of information structure for supporting the various activities and information structures described herein. The memory may be communicably connected to the processor and provide computer code or instructions to the processor for executing the processes described herein. The processor may be implemented as a general-purpose processor, an application specific integrated circuit (ASIC), one or more field programmable gate arrays (FPGAs), a digital-signal-processor (DSP), a group of processing components, or other suitable electronic processing components.

It is important to note that the construction and arrangement of the elements of the systems and methods as shown in the embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. The order or sequence of any process or method steps may be varied or re-sequenced, according to alternative embodiments. Other substitutions, modifications, changes, and omissions may be made in the design, operating conditions, and arrangement of the preferred and other embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A natural gas system for a vehicle, comprising:
a tank configured to provide a supply flow of natural gas;
a conduit defining a flow path, the conduit including a first end coupled to the tank and a second end configured to be coupled to an engine;
a valve disposed along the flow path, wherein the valve is configured to provide a regulated flow of natural gas to the engine by adjusting the supply flow of natural gas;
an accumulator disposed along the flow path downstream of the valve, the accumulator having a volume between an inlet and an outlet, wherein the volume, the inlet, and the outlet form a portion of the flow path, the accumulator thereby positioned to buffer at least a portion of the variations in the flow of natural gas such that the engine receives a consistent flow of natural gas, wherein the accumulator includes a movable wall, wherein an effective volume of the accumulator varies based on the position of the movable wall;
a pressure transducer disposed along the flow path downstream of the valve, wherein the pressure transducer is configured to provide sensor signals relating to a pressure of the regulated flow of natural gas; and
a controller configured to:
evaluate a target pressure for the regulated flow of natural gas;
selectively engage the valve based on the target pressure such that the valve provides a pressure adjustment;
monitor the sensor signals for a fluctuation in the regulated flow of natural gas, the fluctuation comprising a pressure variation produced due to physical interaction of the supply flow of natural gas with at least one of the conduit and the valve;
adjust the valve based on the fluctuation such that the engine receives natural gas at the target pressure; and
vary the position of the movable wall in response to the pressure of the regulated flow of natural gas.

2. The system of claim 1, wherein the controller is configured to evaluate the sensor signals and compare the pressure of the regulated flow of natural gas to the target pressure.

3. The system of claim 2, wherein the valve includes a solenoid positioned to engage a movable valve element, wherein the pressure of the regulated flow of natural gas varies based on the position of the movable valve element.

4. The system of claim 2, further comprising a throttle position sensor configured to provide information relating to a requested throttle input, wherein the controller is configured to determine the target pressure based on the requested throttle input.

5. The system of claim 2, wherein the controller is configured to determine the target pressure based on an engine condition.

6. The system of claim 1, wherein the movable wall comprises a flexible bladder.

7. The system of claim 6, further comprising an actuator operatively coupled to the controller, wherein the controller is configured to engage the actuator to selectively reposition the flexible bladder by at least one of inflating and deflating the bladder.

8. The system of claim 1, wherein the movable wall comprises a rigid wall.

9. The system of claim 8, further comprising an actuator operatively coupled to the controller, wherein the controller is configured to engage the actuator to selectively reposition the rigid wall.

* * * * *